(12) United States Patent
Greene et al.

(10) Patent No.: US 6,188,454 B1
(45) Date of Patent: Feb. 13, 2001

(54) COMPENSATION FOR EDGE EFFECTS AND CELL GAP VARIATION IN TILED FLAT-PANEL, LIQUID CRYSTAL DISPLAYS

(75) Inventors: Raymond G. Greene, Ovid; J. Peter Krusius, Ithaca; Dean W. Skinner, Vestal; Boris Yost, Ithaca, all of NY (US)

(73) Assignee: Rainbow Displays, Inc., Endicott, NY (US)

(*) Notice: Under 35 U.S.C. 154(b), the term of this patent shall be extended for 0 days.

(21) Appl. No.: 09/579,362

(22) Filed: May 26, 2000

Related U.S. Application Data

(62) Division of application No. 09/396,142, filed on Sep. 15, 1999, now Pat. No. 6,115,092.

(51) Int. Cl.[7] .............................. G02F 1/1347; G02F 1/13; G09G 3/36; G09G 5/06; H04N 5/66
(52) U.S. Cl. .............................. 349/74; 349/75; 349/187; 345/88; 345/199; 345/903; 348/383
(58) Field of Search .................... 349/73–75, 187, 349/106; 345/88, 103, 87, 199, 109, 903; 348/383

(56) References Cited

U.S. PATENT DOCUMENTS

| | | | |
|---|---|---|---|
| 4,799,053 | * 1/1989 | Van Aken et al. | 340/703 |
| 4,990,905 | * 2/1991 | Kujik | 340/805 |
| 5,293,159 | * 3/1994 | Bassetti, Jr. et al. | 345/103 |
| 5,652,605 | * 7/1997 | Nishioka et al. | 345/199 |
| 5,668,569 | * 9/1997 | Greene et al. | 345/103 |
| 5,696,539 | * 12/1997 | Welti et al. | 345/199 |
| 5,838,396 | * 11/1998 | Shiota et al. | 348/383 |
| 6,005,649 | * 12/1999 | Krusius et al. | 349/74 |
| 6,014,193 | * 1/2000 | Taira et al. | 349/73 |
| 6,020,868 | * 2/2000 | Greene et al. | 345/88 |
| 6,100,861 | * 8/2000 | Cohen et al. | 345/88 |

\* cited by examiner

Primary Examiner—William L. Sikes
Assistant Examiner—Tarifur R. Chandhury
(74) Attorney, Agent, or Firm—Salzman & Levy

(57) ABSTRACT

The present invention features procedures for correcting discoloration and brightness variations due to liquid crystal cell gap variations or other optical, electro-optical, ambient light, electronic, mechanical, and materials anomalies arising in tiled, flat-panel displays. The purpose of these corrections is to achieve a visually seamless appearance. Absolute, relative and/or smoothing corrections are implemented by performing pixel data video processing with correction data acquired from memory. Techniques for determining and applying these corrections are described.

11 Claims, 13 Drawing Sheets

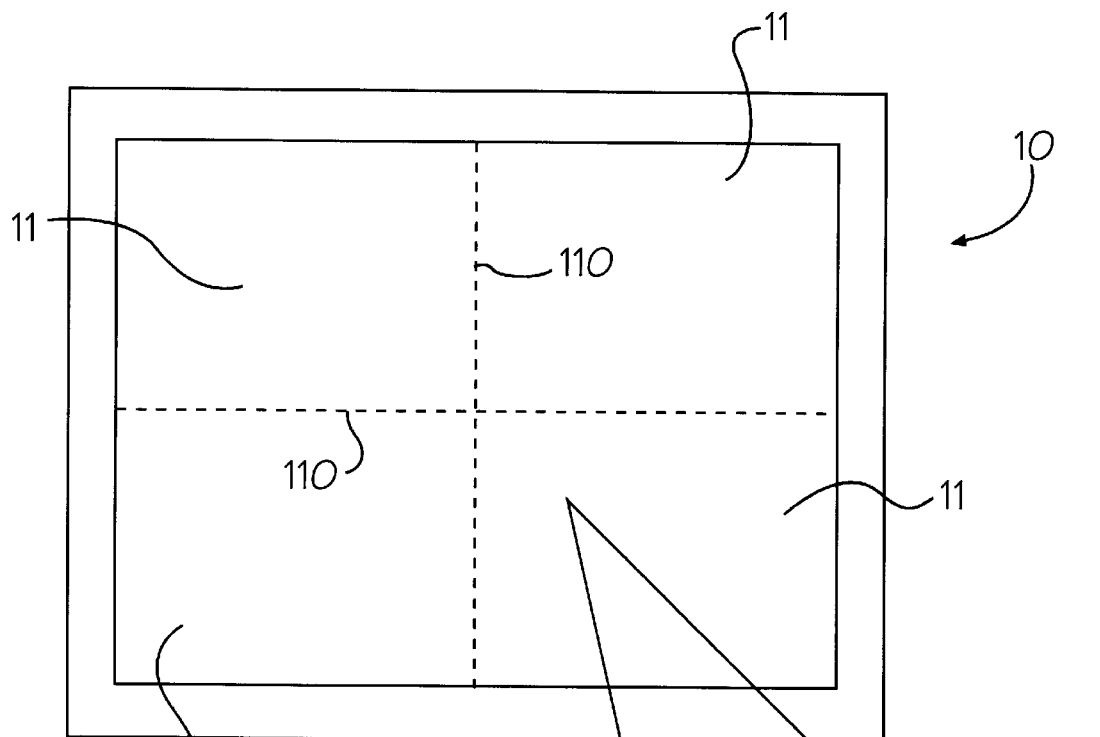
*Figure 1a*
PRIOR ART
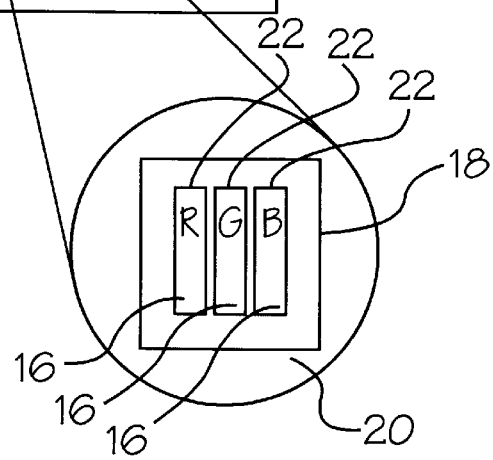
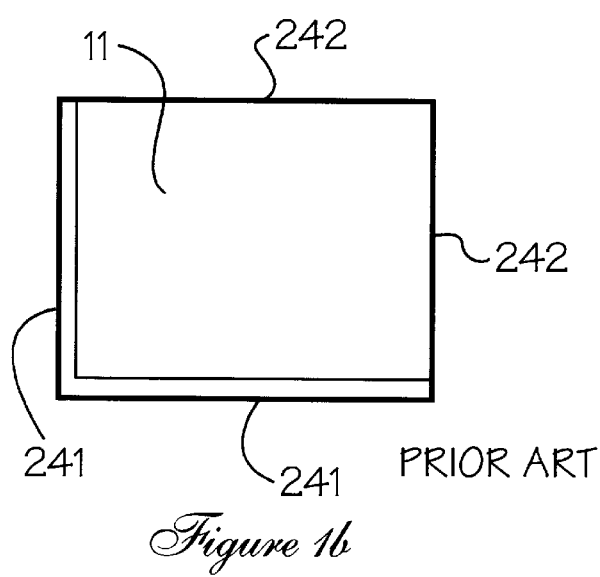
PRIOR ART
*Figure 1b*

COMPENSATION FOR EDGE EFFECTS AND CELL GAP VARIATION IN TILED FLAT-PANEL, LIQUID CRYSTAL DISPLAYS

This application is a Divisional of Ser. No. 09/396,142 filed Sep. 15, 1999 now U.S. Pat. No. 6,115,092.

FIELD OF THE INVENTION

The present invention pertains to compensating for brightness and color variations in tiled, liquid crystal (LC), flat-panel displays and, more particularly, to compensating means to correct for such changes near the tile edges due to optical anomalies, electro-optical aberrations, electronic driving effects, ambient light, LC cell gap, mechanical, or materials variations.

BACKGROUND OF THE INVENTION

Flat-panel displays made in accordance with known liquid-crystal display (LCD) technologies are both limited in size and expensive to manufacture. Inexpensive, larger displays can, in principle, be made by assembling smaller display "tiles", but such a resultant, larger display generally reveals the seams between the tiles. How to conceal the seams between tiles, so that the assembled, large display looks like a continuous, one-piece unit, is very difficult, because the human eye can detect minute irregularities as long as they are arranged in patterns.

One method for making tiled displays is to connect four tiles together at common locus lines, using an adhesive sealant along the seams between adjacent tiles. The tiles are assembled in an in-plane fashion. This type of construction is shown in co-pending U.S. patent application bearing Ser. No. 08/652,032 (filed on May 21, 1996), entitled "Construction and Sealing of Tiled, Flat-Panel Displays", hereby incorporated by reference. This method of construction consists of assembling LCD tiles in a planar fashion, by locating the appropriate alignment marks disposed on each tile with matching marks on a common reference plate, usually on the cover or back plate. Specific overlay tolerances are required from such an alignment. The tiles are attached to the cover plate and back plate with an optical adhesive. Prior to assembly, the adjacent tile edges are finished such that they in their final position in the assembly provide a seamless appearance. In addition, the cover and/or back plates may contain opaque masks used to "hide" the seams. The back masks can also serve as light collimating means.

Liquid-crystal display tiles may be fabricated in the same manner as monolithic LCDs with one exception: the inner tile edges at the inter-tile seams generally must have pixels located approximately within a pixel pitch from the inner seal edge, so that the pixel pitch across the seam is substantially the same as that on the tiles. In addition the tile edges will usually have design features that control the position of the seal material in relation to the pixel apertures and that contribute to keeping the cell gap uniform. These issues are described in co-pending patent applications Ser. No. 08/949,357 (filed Oct. 14, 1997) and Ser. No. 09/368,921 (filed Aug. 6, 1999).

As in monolithic LCDs, the two glass plates comprising the LC tile are spaced apart by small transparent balls, while the seal adhesive thickness is generally determined by spacer balls or cylinders embedded in it. Thus there will inherently be some variation in the LC layer thickness near the edges of the tiles. This variation in the LC cell gap causes noticeable discoloration of the pixels near the seams in a tiled, flat-panel LC display. No such artifacts are generally observed on monolithic LCDs because their pixels are never placed into close proximity with the seal located completely outside the pixel array.

A pixel in a color LCD is customarily made up of an aperture opening containing sub-pixels for each primary color, usually red, green and blue (RGB). Because of spatial variations in the amount of optical retardation experienced by light traveling through the LC cell, different wavelengths of light produce dissimilar visual effects, when variations in the LC cell gap thickness exist. This phenomenon compounds the problems arising in the production of tiled flat-panel liquid crystal displays that are required to exhibit a seamless appearance.

The majority of liquid-crystal display modules made today are digitally controlled devices. An optical transmission-drive voltage relationship (T-V curve) or "gamma curve" relates the digital signal values at the input to the voltage across the liquid crystal cell, and therefore to the luminance of each sub-pixel on the display. Unless otherwise noted, the T-V curve is here considered to be an effective relationship that includes the entire display system response from the electronic drive signal to the resulting luminance. In some color schemes, a linear effective relationship is desired, e.g., the NTSC R, G, B system. In other color schemes a more general weighted response curve is preferred, for example, to meet psychophysiological expectations of the viewer. Color is produced by overlaying color filter layers on top of the sub-pixel apertures. Usually three separate color filters are used to produce primary colors that through additive mixing generate all hues within the desired color gamut. In tiled, liquid crystal displays, small cell gap variations near the seams or between tiles result in changes in the effective T-V curve. As a consequence, a tiled flat panel display has an objectionable, "tiled" appearance, in spite of all efforts to geometrically hide the actual seams. Pixel areas near the seams or the tile boundaries will inevitably become visible, because their effective T-V curves differ from those of pixels in the interior of the tile.

Pixel rows and columns adjacent to the inner seams in a matrix-addressed tiled display also have a somewhat different electro-optical response compared to interior pixels away from the seams. For example, in a display with four tiles, these pixels form visually disturbing vertical and/or horizontal bands around the seams through the center of the tiled display. In particular, it is common for such a tiled display to appear seamless in white and black fields, but have quite visible seams in gray-scale fields between white and black. Since there usually are 256 gray-scale levels for each primary color, there is ample opportunity to reveal the seams, especially combined with the ability of the human eye to detect regular patterns emanating from the seams.

Another mechanism that causes color variations in tiled displays arises from the mis-registration of objects in the optical stack. Color filter layers on each tile may be mis-aligned compared to the to the thin film transistor layer. Also, the external masks on the cover and back plates may be mis-registered compared to alignment marks in the stack. Further, the lateral and height positioning of each tile compared to the color filter and thin film layers always involves alignment tolerances. As a consequence each tile edge show a slightly different response to the partially collimated light beam that is traversing the optical stack of the tiled LC display.

Additionally, the LC domains at pixels close to the inner seams are known to have different electro-optical properties.

This may be caused, for example, by solvents leaching into the LC material from the seal adhesive. Furthermore, the absence of adjacent pixels, and therefore fringing electrical fields originating from them, also contributes to the dissimilar characteristics of the electro-optical properties of edge pixels.

The seam areas between tiles usually produce additional anomalous stray light that is absent on pixels away from the seams. Anomalous stray light can originate either from the backlight or ambient light, or be produced in the optical stack of the display. These effects arise either from the discontinuous tiled LCD structure or from imperfections in the manufacture or assembly of the tiled display. For example, specular and diffuse reflections from an irregular tile edge surface finish or sub-surface micro-cracks may occur. Air bubbles in the adhesive, material defects, or chipping of the tile glass edges may also contribute additional light emanating from the pixels near the edge of the tiles. Flaws in the tiles or assembly also tend to cause some depolarization of the light passing through pixels close to the seam areas, thus contributing to a brighter than normal appearance of such edge pixels, yet another optical anomaly at the tile edges. Differences in misalignment of apertures, color filters, or thin film layers among adjacent tiles produces multiple source for stray light at seams. Tile misregistration either in the lateral direction parallel to the glass surfaces (Y, Y direction) or in the perpendicular direction determined by adhesive layers provides further sources. Anomalous light at the seams induced by ambient light will be most pronounced, when the display shows a low luminance image (e.g. close to black levels) and ambient light impinging of the display is strongest.

Further, "artificial" boundaries similar to seams can be created by the electronics used to drive the LC display. These artificial boundaries are common optical artifacts that can be observed on "dual scan" notebook personal computer displays. For example, in a four tile, 2×2 tile array display, boundaries which may exhibit optical artifacts at the tile edges can therefore be caused by "quad scan" control electronics and LC panel drivers. In such a quad-scan drive both row (gate) and column (data) lines for each quadrant of the display are driven independently using progressive scans. When the voltages, timing, or other elements of such electronic circuits do not match exactly, artificial electronic "seams" may be created. Such electronic "seams" can, of course, also arise on monolithic LCD's which do not have any "physical" seams.

Any corrections made to images on tiled electronic color displays are subject to the luminance and color difference discrimination thresholds of the human vision system. Different threshold criteria apply to abrupt and gradual changes in luminance and chromaticity. These thresholds have been described in our U.S. patent application Ser. No. 08/593,759, filed Aug. 26, 1997, now issued as U.S. Pat. No. 5,661,531, as well as our co-pending U.S. patent applications Ser. Nos. 08/649,240, filed May 14, 1996; 08/780,911, filed Jan. 9, 1997; and 09/173,468 filed Jun. 30, 1999, all included herein by reference.

The present invention provides compensating means to correct for undesirable optical, electro-optical, and ambient light aberrations and for electronic anomalies, near the tile edge at the tile-to-tile seams, whether of vertical or horizontal orientation. Correction means are applied so that luminance and chromaticity of the tiles in the display appear to be essentially uniform across the seams.

It is an object of this invention to provide compensating means to correct for the effects of LC cell gap variations. Cell gaps at the tile edge rarely match those in the interior of the tile, thereby causing visible seams. Correction means are applied so that luminance and chromaticity of the display becomes visually continuous across the seams.

It is another object of this invention to provide compensating means for correcting for the effects induced by any other optical, electro-optical, mechanical, or structure related anomalies in tiled LC displays, including those due to variations in the cell gap so that the seams become visually imperceptible. Chromaticity and luminance variations at the seams are corrected or smoothed over multiple pixels so that residual variations become visually essentially uniform. Luminance and chromaticity variations are thus suppressed and seams become visually imperceptible.

It is another object of this invention to correct for optical aberrations caused by artificial boundaries (seams) due to partitions of electronic scans, control and drivers, whether occurring on tiled or monolithic display.

Another objective of this invention is the electronic correction of the brightness of all of the pixels across the interior of the tiles so that the display appears to be of uniform light intensity or luminance. Such corrections are made for each display assembly and are unique to that display.

SUMMARY OF THE INVENTION

In accordance with the present invention, there is provided compensating means to correct for visual nonuniformities at edges of the tiles in tiled flat panel displays in order to produce a seamless appearance. Such a display comprises multiple tiles that are bonded together between continuous polarizers with an optical adhesive. The display may also have a cover plate which contains an aperture mask, a screen, and a back plate containing another aperture mask. Tile edge nonuniformities include those due to LC cell gap variations and other seam related optical, electro-optical, ambient light, electronic, mechanical, and materials anomalies. Knowledge of these anomalies is used to develop algorithms to correct for brightness and color imbalance near the edge of each tile. These algorithms alter the drive signals to sub-pixels located in close proximity to the seams and in the interior regions of the tiles. Electronic video processing combined with previously acquired data from a correction data memory is used to implement the correction algorithms for the pixels adjacent to the seams and in the interior of the tiles in tiled, flat-panel, LC displays. The resulting absolute, relative, or smoothing corrections made are unique to each tile and possibly unique to each edge pixel as well.

BRIEF DESCRIPTION OF THE DRAWINGS

A complete understanding of the present invention may be obtained by reference to the accompanying drawings, when considered in conjunction with the subsequent, detailed description, in which:

FIG. 1a illustrates a planar view of a tiled, flat-panel display constructed in accordance with techniques of prior art;

FIG. 1b is a schematic view of one of the tiles in a tiled, flat-panel display of FIG. 1a (narrow seals inside and wide seals outside);

For purposes of both clarity and brevity, like elements and components will bear the same designations and numbering throughout the FIGURES.

DESCRIPTION OF THE PREFERRED EMBODIMENT

Figure 2:
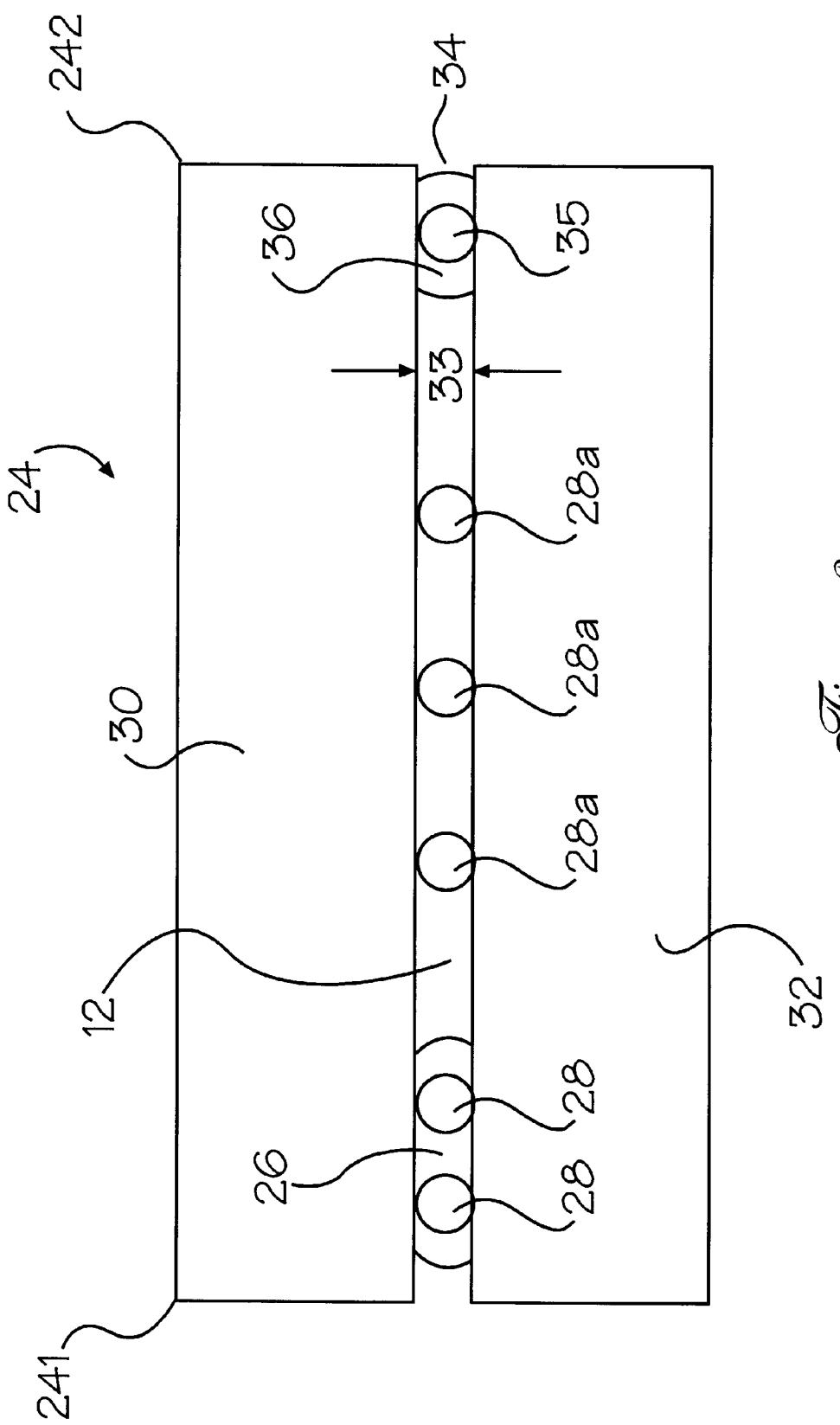
FIG. 2 depicts a cross sectional view of an LCD tile with spacers in the seals and spacers in the view area.

Generally speaking, this invention features electronic control means and a method for compensating or correcting optical, electro-optical, electronic, mechanical and materials anomalies near the tile-to-tile seams, including those due to cell gap variations in tiled, flat-panel, LC displays. In addition, the invention features means and methods for correcting discoloration generally observed in tiled, flat-panel, LC displays near the seams between adjacent tiles. Further, the invention provides means and methods for correcting brightness variations caused by such seams in tiled, flat-panel, LC displays. Corrections are done by matching pixel absolute or relative luminances or smoothing spatial luminance differences.

Now referring to FIG. 1a, a planar view of a color LC display 10 is shown. The display 10 consists of multiple tiles 11 separated by seams 110, each with an LC cell 12 (FIG. 2), and two common external polarizers (not shown). The four tile array is shown as an illustration only. Other tiling configurations are covered as well. Patterned color filter layers 16 are placed and aligned in the active area 18 of the pixel window 20 to produce three primary colors. These color sub-pixels 22 are operated independently. The color filters 16 are typically chosen to be red, green and blue (or RGB). FIG. 1b also shows the planar view of a tile 11 used in the display 10. The liquid crystal seal is wide along the outer edges 241 of the tile (heavy line) and narrow along the inner edges 242 (narrow line). Tile inner edges 242 are placed adjacent one another, forming seams 110 as shown in FIG. 1a.

FIG. 2 is a cross sectional view of a portion of an LC tile 11 used in a tiled and assembled display 10 (FIG. 1). The vertical and lateral dimensions are drawn to a different scale in order to illustrate all essential details. The figure depicts the seal 26 and the spacer balls 28 within the seal 26 normally used in the fabrication of the LC cells 12. The two glass plates, 30 and 32 forming the LC cell 12, are bonded together around their respective perimeters under pressure, in order to maintain an accurate cell gap 33, or spacing between the inner surfaces of the two plates 30 and 32, as determined by the size of the spacer ball 28a located in the view area. The cell gap 33 near the inner seal edge 34 is determined by the spacer balls or spacer rods 35, dispersed in the seal adhesive 36, and the pressure, temperature and time parameters used in the tile bonding process. Generally a similar cell gap variations occur at the outer seal edge, but they do not usually give rise to visually disturbing artifacts, because pixels are not placed in close proximity to these outer seals. The structure and design of the tiles outside the pixel array greatly influences the cell gap and hence potentially induces variations in the cell gap as well. Examples of possible designs are described in co-pending patent U.S. application bearing Ser. No. 09/386,921 (filed Aug. 6, 1999).

Inherently then, there will be variation of the cell gap 33 in each tile 11 near the inner seal edge 34 due to the structure and process variables despite efforts to optimize the cell gap. This cell gap variation is well behaved and smooth within a tile 11, but discontinuous from tile to tile. In addition, the tiled display assembly process, especially the attachment of the tiles with optical adhesive to cover and back plates, may alter the cell gap 33 as well.

Generally, a similar cell gap variation occurs at the outer seal edge, but this does not usually give rise to visually disturbing artifacts, because pixels are not placed in close proximity to these outer seals. It will be obvious to those skilled in the art that nominal cell gaps may be controlled by one or more design features.

Figure 3:
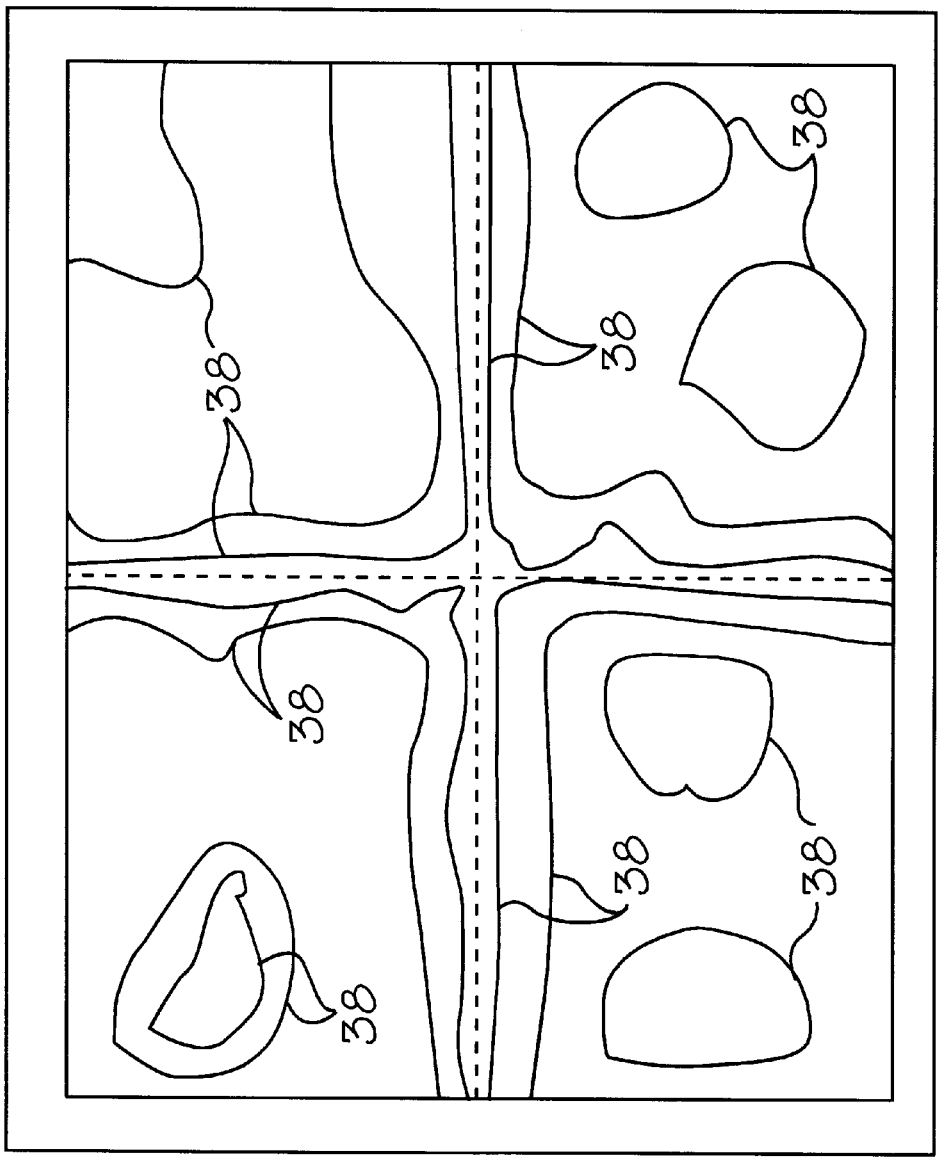
FIG. 3 illustrates a topographical map of typical cell gap variations in a tiled, flat panel display.

FIG. 3 shows a typical topographical map of cell gap variations in an assembled, tiled display 10. In this example, each contour line 38 represents a cell gap variation of approximately 0.25 μm from the nominal cell gap, typically approximately 5 μm for state-of-the-art AMLCD's. Island formation and relatively uniform edge effects are typical. Cell gap variations are usually largest at the inner seals because of their narrow width.

Figure 4:
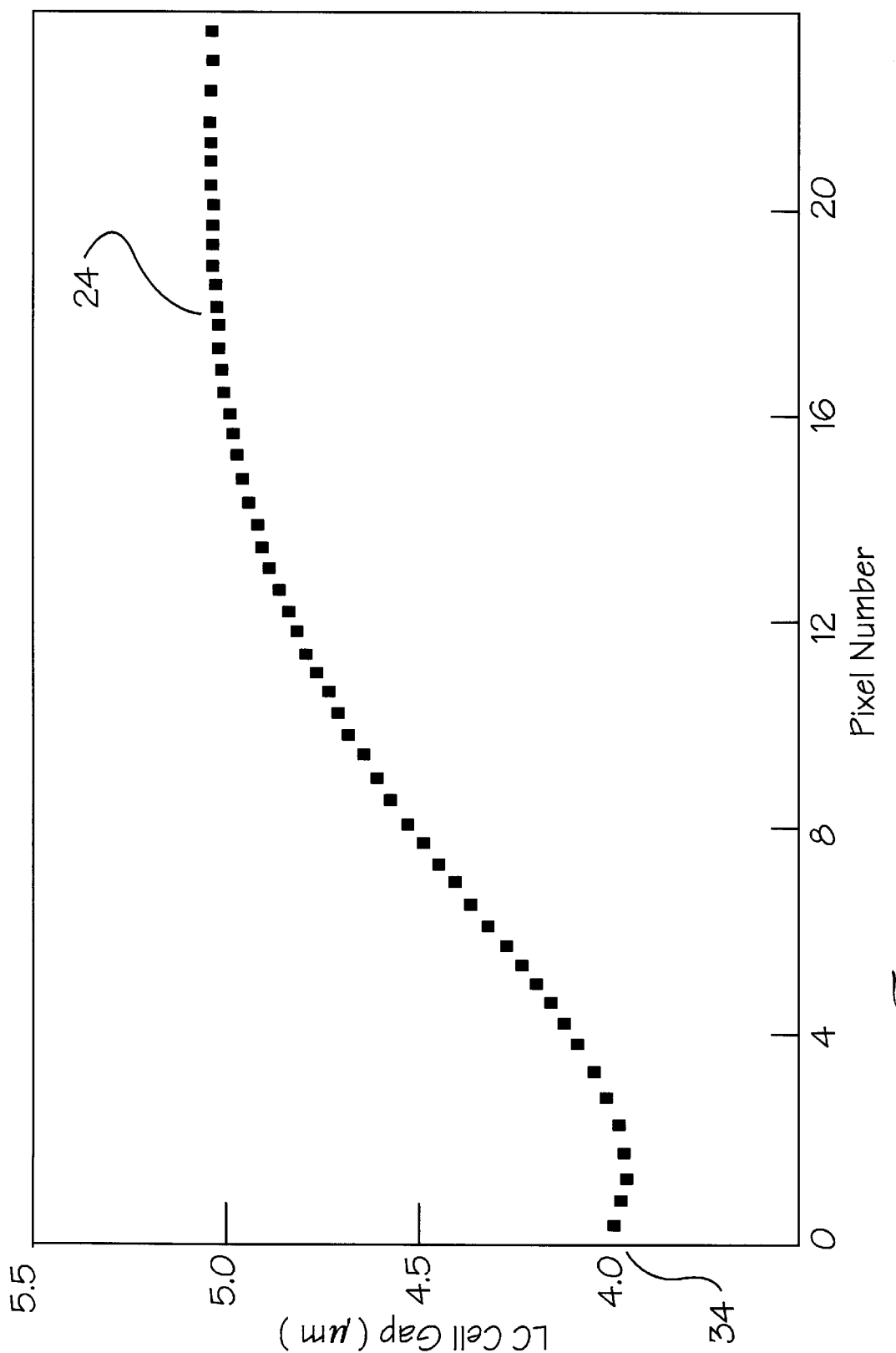
FIG. 4 depicts the calculated cell gap variation for an LC tile from the edge towards the interior of the tile.

FIG. 4 depicts the cell gap 33 variation profile from the narrow seal 34 (FIG. 2) towards the center of the tile as calculated from mechanical plate bending theory, well known to those skilled in the mechanical design arts, for a typical tile used in a tiled LCD assembly. The length scale on the horizontal axis is measured in pixel pitches, typically on the order of one millimeter or less. Notice that the effects near the inner edge 34 penetrate a considerable distance into the interior of the tile 11. Brightness changes that result from the variation of the cell gap 33 impact the effective transmission-voltage (T-V) curve of the sub-pixels. The LC in the reduced cell gap 33 near the inner seal 34 is more responsive to voltage changes for drive voltage signals corresponding to mid-range brightness (gray scale between black and white) than a pixel with the nominal cell gap.

Figure 5:
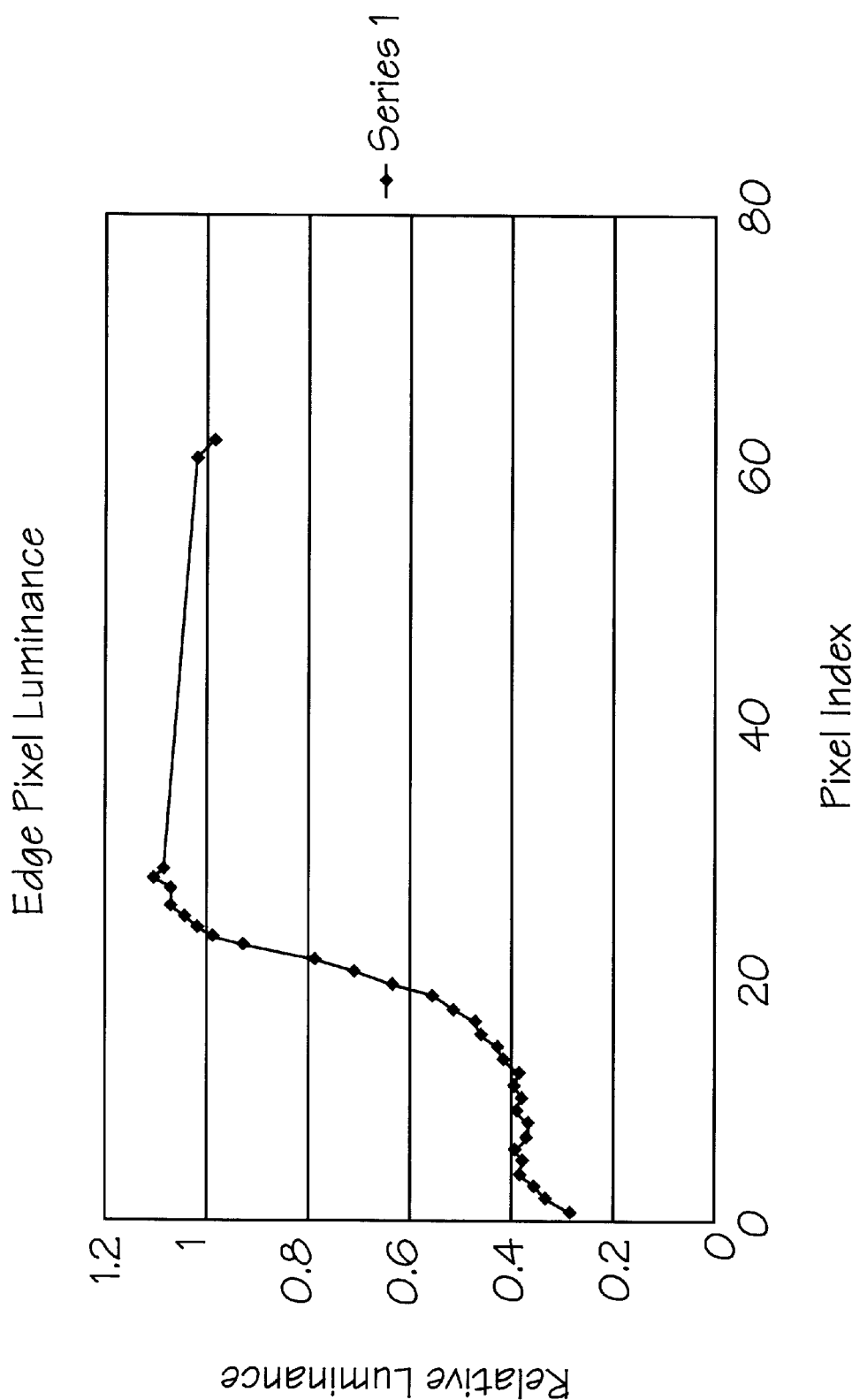
FIG. 5 illustrates a worst case measured normalized pixel luminance near the edge of an LC tile from the edge towards the center of the tile.

FIG. 5 shows typical worst case measured experimental data for the variation in optical transmission through an LC tile 11 (relative luminance) from the inner edge seal 34 towards the interior of the tile 11. The length scale is given in pixel pitches. The optical transmission is altered near the inner seal as a result of the cell gap 33 variations depicted in FIGS. 3 and 4.

Figure 6:
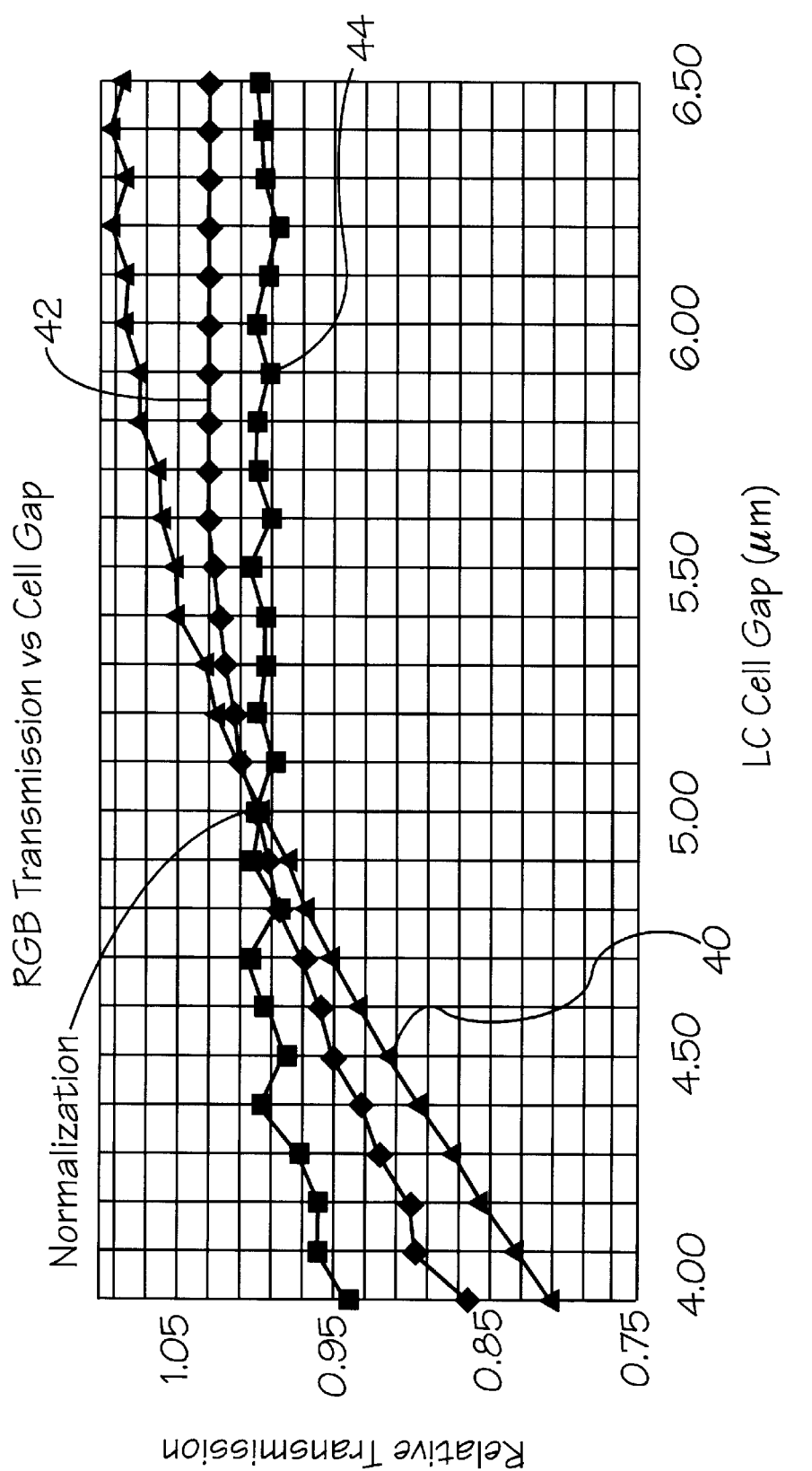
FIG. 6 illustrates the relative optical transmission for the three primary colors (R, G, and B sub-pixels) due to LC cell gap thickness variation in a tile.

FIG. 6 depicts the relative predicted optical transmission for red 40, green 42, and blue light 44 as a function of the cell gap 33. The transmission has been normalized to the nominal case (cell gap of 5 $\mu$m in this illustration). Because both the cell gap and the wavelength of light affect the optical retardation through the LCD cell, the color balance will change spatially as the cell gap 33 varies. If the cell gap near the seal 34 is smaller than in the interior of the tile 11, the seam area 34 will have a bluish cast, as evidenced by FIG. 6 (enhanced blue). Similarly, if the cell gap 33 near the seal 34 is larger, the seam area 34 will have a brownish cast (enhanced red and green).

The spectrum of white light is altered as light passes through the cell gap, if it is not at its nominal value (5 $\mu$m in this illustration). The desired spectrum of light emanating from the display 10 is one where the three primary colors are balanced to the white point of the display (i.e., equal drive signal values in the RGB color system). Therefore, the cell gap should ideally be set exactly at its nominal value at all pixel locations on the tiles (5 $\mu$m in this illustration). In practice, however, it is desirable for the cell gap to be as uniform as possible, in order to produce the correct spectral output. This is very difficult to achieve without the teachings of this invention.

Figure 7:
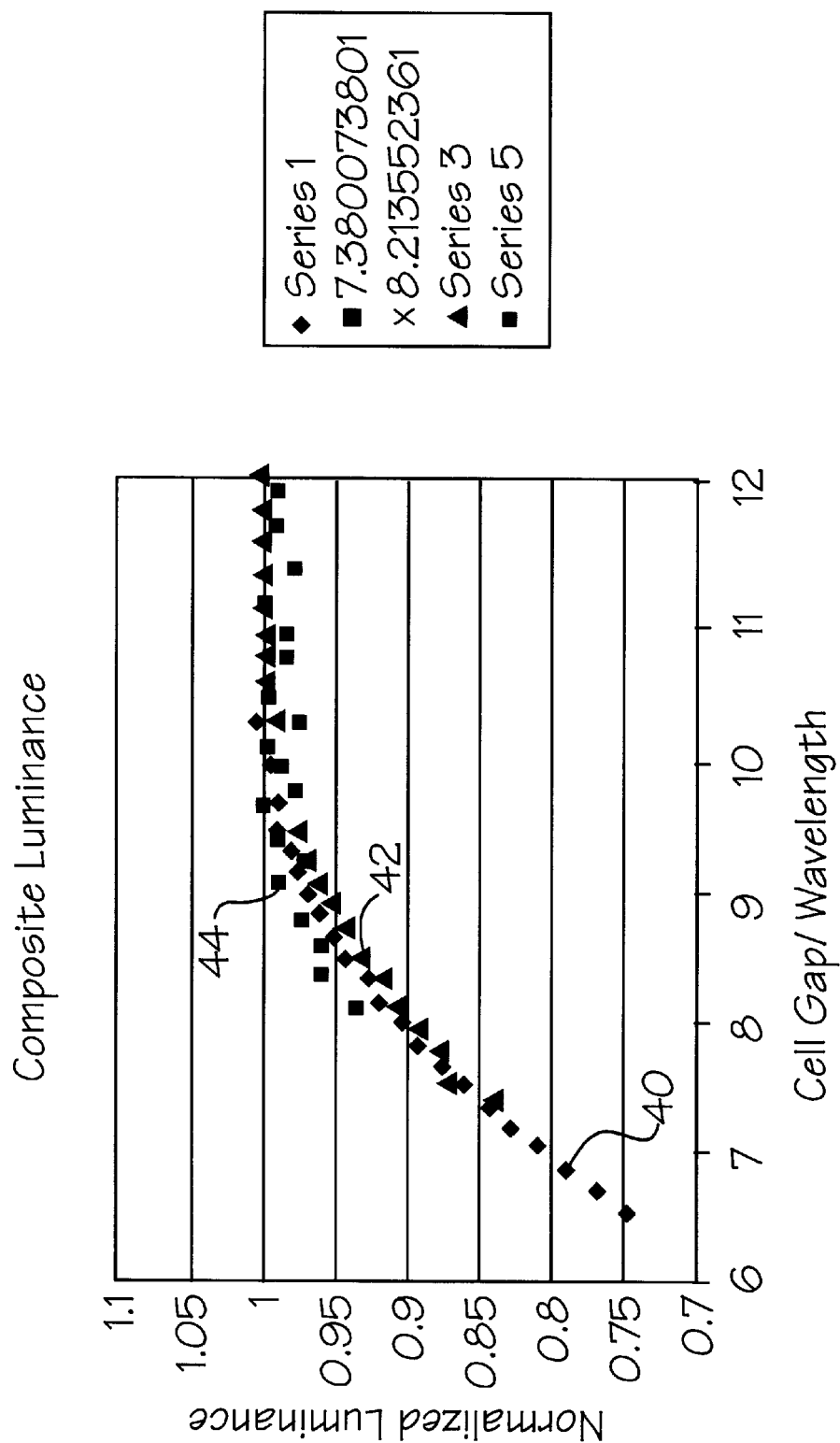
FIG. 7 depicts the normalized luminance in an LCD tile as a function of the ratio of the cell gap and wavelength for green blue and red light.

Now referring to FIG. 7, the typical simulated normalized luminances of the sub-pixels in an LCD cell are plotted as function of the optical length of the cell gap 33 for red 40, green 42 and blue 42 light with wavelengths of 612, 542, and 487 nm, respectively. The optical length was determined by the ratio of cell gap and the wavelength of light.

Therefore, it is desirable to correct pixels with slightly different effective T-V curves and other small optical, electro-optical, ambient light, electronic, mechanical, or materials anomalies close to the seams by changing the drive signals of the pixels in order to make their appearance more uniform especially at the seams. Such corrections can either be done by matching the absolute luminance and chromaticity values defined in the nominal design or by matching the relative luminance and chromaticity values of one or multiple reference areas on the display, preferably located in the interior of the tiles. Consequently, absolute or relative luminance levels of the sub-pixels close to the seams will be within the visual perception threshold of the nominal design or reference area specifications of pixels in the interior of the tiles. Therefore, input data for each pixel according to this invention is replaced with new data from a correction procedure. This new data will be sent to commercially available column (data) driver chips connected electronically to the liquid-crystal display in the conventional manner. Any correction data will be calculated in advance by applying the inverse of the transfer function to the domain of the input data, or input code range. The correction data may be different for each pixel or group of pixels of the display, thus accounting for the difference in the characteristics of each pixel. A lookup table is one possible implementation for such a correction algorithm. Unfortunately, such a correction scheme would result in a design that is so complex it could not be implemented economically for a large number of pixels using present state-of-the-art electronics. Therefore, it is necessary to describe the deviations in the effective T-V curves of the sub-pixels in a manner that greatly reduces the amount of data that must be stored and accessed, as well as the amount of computation that must be performed for the video signal corrections during display operation.

Figure 8:
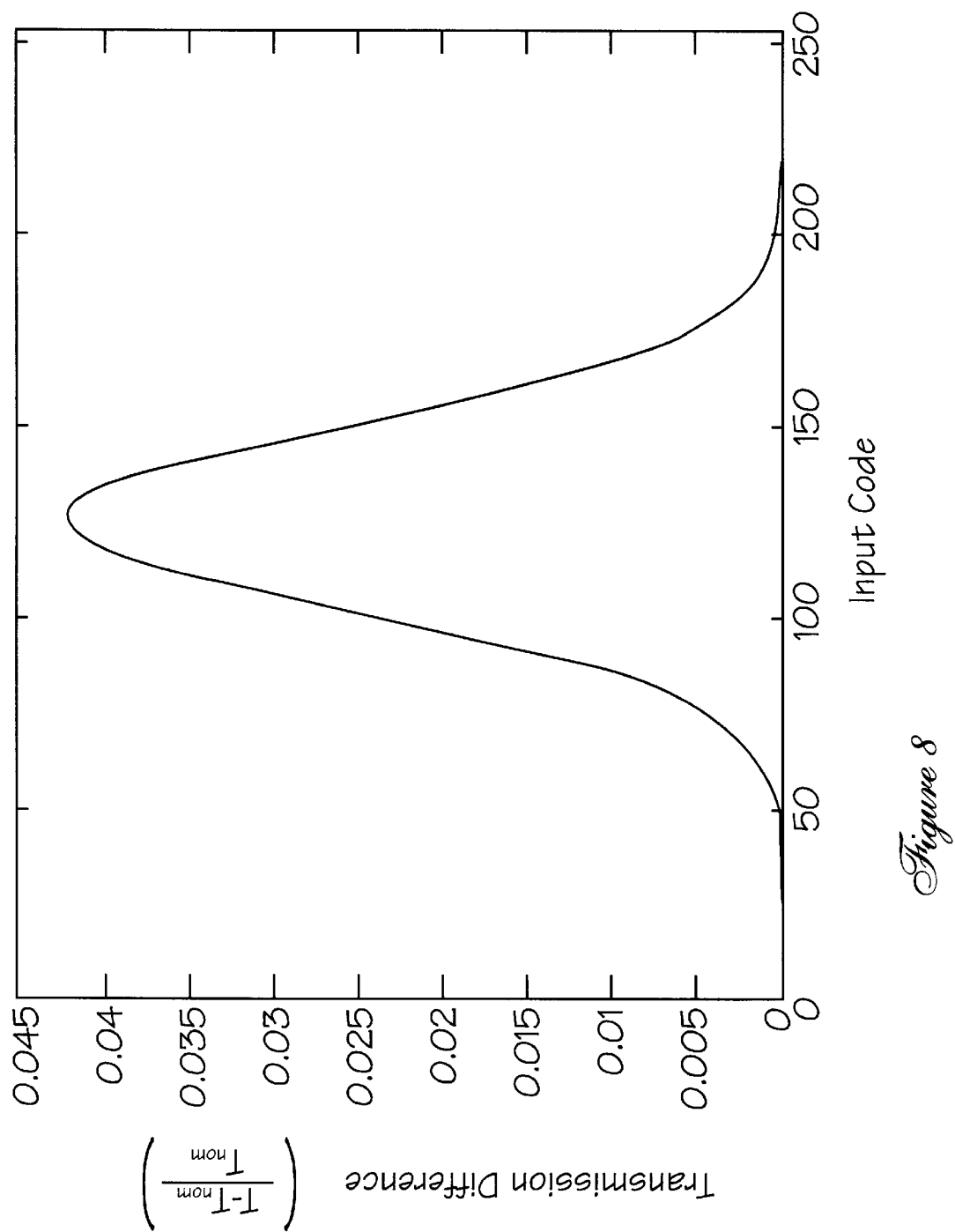
FIG. 8 illustrates a typical difference between the normalized effective T-V curves (0–1 domain) of two sub-pixels as a function of the input signals specified in a $2^8$-bit range (0–255 domain)
Figure 9:
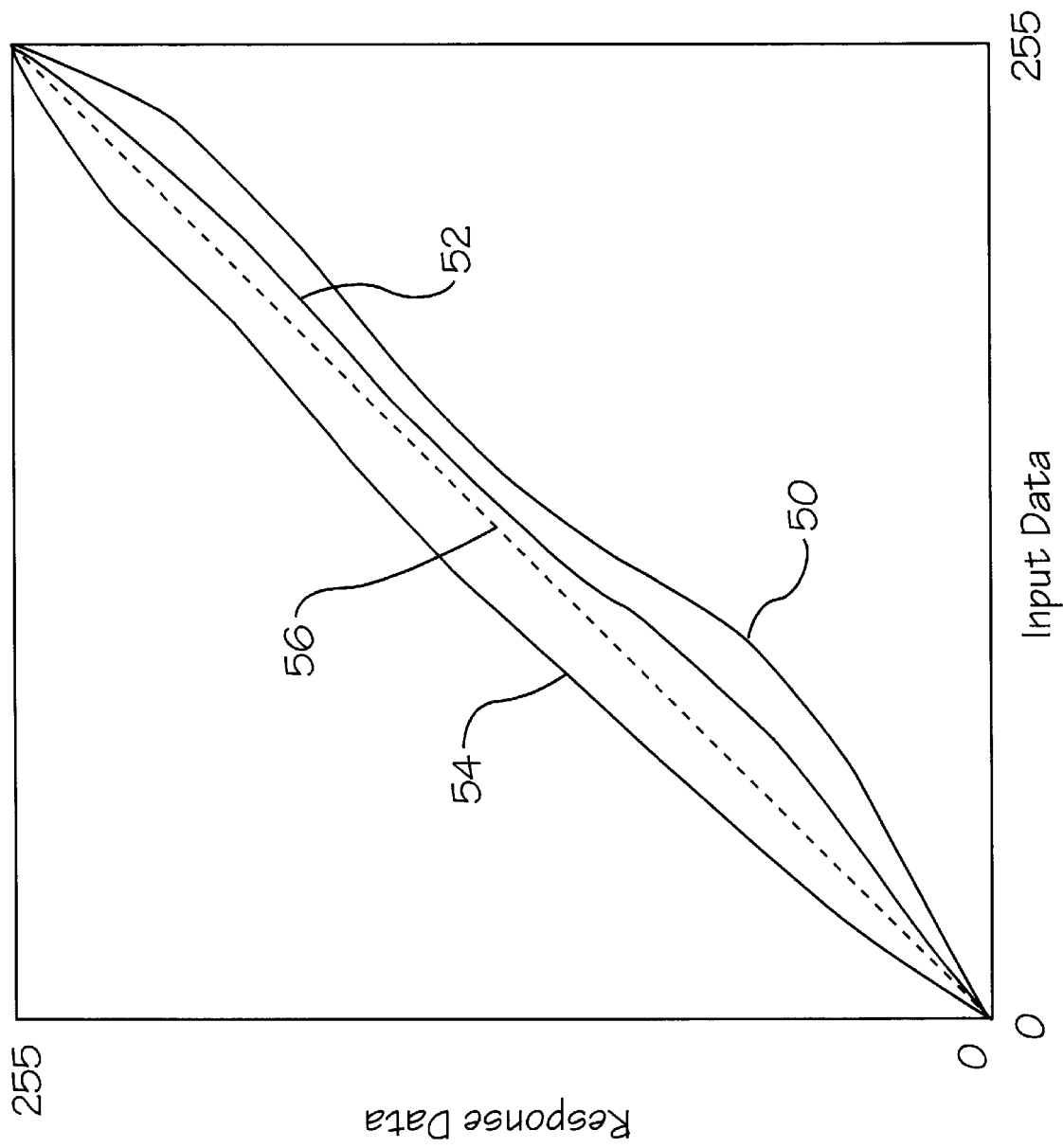
FIG. 9 depicts the deviation of the relative luminance of red, green, and blue sub-pixels from the nominal specified in terms of linear $2^8$ bit input and output signals.

It is known that effective transmission-voltage (T-V) curves, or gamma curves, for AMLCDs, whether representative of the nominal design or differing from it because of reasons described above, are continuous functions. Therefore, the differences between a deviant and the nominal effective T-V curve is not only a continuous function, but generally a rather smooth function on the scale of the least significant bit of the data driver. The difference between two typical effective T-V curves 48, one shifted with respect to the other by a small amount but otherwise identical shape, shown in FIG. 8 illustrates the smoothness of the difference in the effective T-V curves. This shift simulates a typical deviation of the effective T-V curve that leaves the white and black states unchanged but greatly affects gray scale levels in between for each sub-pixel. The normalized linearized luminance differences for all primary colors are further illustrated in FIG. 9, in which 8 bit nominal input signals to the red 50, green 52 and blue 54 sub-pixels produce output luminance values for each primary color of a specific pixel. These luminance values differ from the nominal response represented by the dashed diagonal line 56 in this graph for each gray scale level and sub-pixel. In the illustration of FIG. 9 it is also assumed that the deviations of the effective T-V curves from the nominal vanish for white and black fields, an assumption that is usually justified because of the basic operation mechanism of the LC cell. This is not a limitation of this invention, but rather a property of this illustration only. An effective T-V curve, or the difference between two effective T-V curves, can therefore be described or approximated by dividing the domain of the function (or input code range) into pieces, and then describing each piece in a simple manner that is easy to compute in real time. Because of the smoothness and the generally small deviations from the nominal, one possibility is to describe each piece by a linear function (piece-wise linear approximation). Then only the slope and offset would need to be stored to describe each piece. Consequently, the inverse transfer function (correction) for each piece would also be a linear function. Higher order polynomial interpolation or spline functions well known in the field of numerical mathematics provide additional techniques for describing the pieces.

Because individual LCD tiles are made from multiple continuous sheets of material, the deviations in the cell gap or other physical properties vary in a smooth and continuous manner compared to the pixel pitch (typically on the order of 1 mm or less). Therefore, these deviations may also be described using "contour mapping" or similar means to group small regions of pixels, or bands of pixels, on a tile that have transfer functions whose differences compared to the nominal design are imperceptible to a human viewer. Then, the transfer function for all pixels within a region or band could refer to one copy of a transfer function that represents the entire region or band. The corresponding inverse transfer functions could then be either simple or complex; however, since a number much smaller than the pixel count would be needed, such a correction scheme could be implemented using a practical amount of electronic hardware.

It is also known that effective T-V curves for AMLCDs, whether representative of the nominal design or deviating from it because of reasons discussed above, have a very similar functional form. Therefore, a small number of reference T-V curves could be described in great detail, for example by using comprehensive lookup tables, as is done to define the T-V curves of commercial LCD driver integrated circuit chips. This small number of effective T-V curves could be used to describe a much larger number of pixels by assigning labels to such T-V curves, and then developing a table of matching labels for the pixels. The characteristics of each pixel would be measured and compared with the reference effective T-V curves, and the label of the closest matching T-V curve would be selected.

Figure 10:
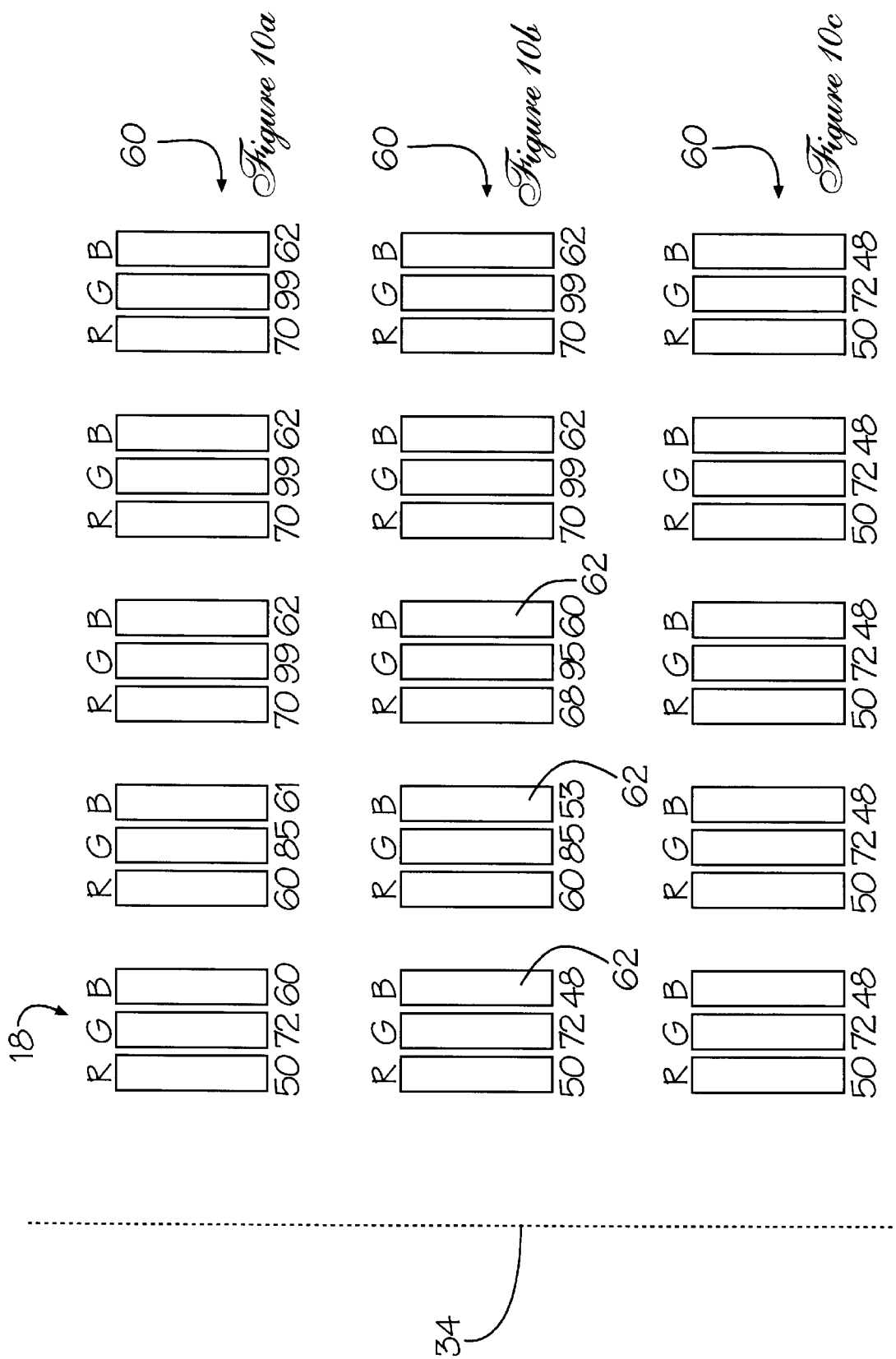
FIG. 10a illustrates the relative brightness of the RGB sub-pixels near the edge of a typical LC tile.
FIG. 10b illustrates the relative brightness of the RGB sub-pixels near the edge of a typical LC tile after being partially corrected.
FIG. 10c illustrates the relative brightness of the RGB sub-pixels near the edge of a typical LC tile after being fully corrected.

FIG. 10a depicts the relative brightness values of RGB sub-pixels in a row of pixels from the inner seal 34 of a tile 11 towards the interior of the tile. A uniform gray scale combination defines the input signals to the primary color sub-pixels. The inner seal 34 is positioned to the left of the pixel row 60 in this figure. The relative brightness values have been normalized into the usual $2^8$ bit range, i.e. 0–255. The RGB signal values in the interior of the tile 11, 70/99/62 respectively, correspond to the nominal drive signal values for this sample gray scale field. No corrections have been applied to the pixels in FIG. 10a. The corrections will be applied in two steps: first considering hue and second brightness.

It is desirable to maintain the ratio of the relative brightness of blue to green and red to green over the entire tile 24 so that no discoloration will become apparent to the viewer (hue correction). The cell gap 33, or its variation, must therefore be measured directly or indirectly in order to apply any corrective action. The color corrected relative brightness values are illustrated in FIG. 10b, where the relative brightness ratios between the primaries have been maintained approximately to the precision of the least significant bit. Electronic controls in color displays typically allow for 8 bit or 256 levels of "gray" for each primary color. The relative blue brightness will be reduced in the sub-pixels 62 near the seal 34 using these controls. These corrections should be done to the frame buffer, (not shown) onto the frame data presented to the display 10. This eliminates tile edge related hue variations over the display 10.

However, these corrections may not restore the display to uniform luminance for uniform gray scale drive signals, because the sum of the relative brightness values varies from the inner edge towards the interior of the tile in the display 10. FIG. 10c shows the relative brightness values of all the sub-pixels 64 from FIG. 10b after they have been corrected for uniform luminance level everywhere. This correction can be achieved by applying a correction bit map image (not shown) to each incoming frame before the latter is sent to the data drivers (usually column) of the display 10. In the preferred embodiment, all pixel data will be changed in accordance with the teachings of this invention. Sub-pixel data is adjusted such that the spectral output from the display 10 is that of the desired hue and brightness uniformly across the entire pixel array of the display. In alternate embodiments, the inventive data corrections may be selectively applied.

Figure 11:
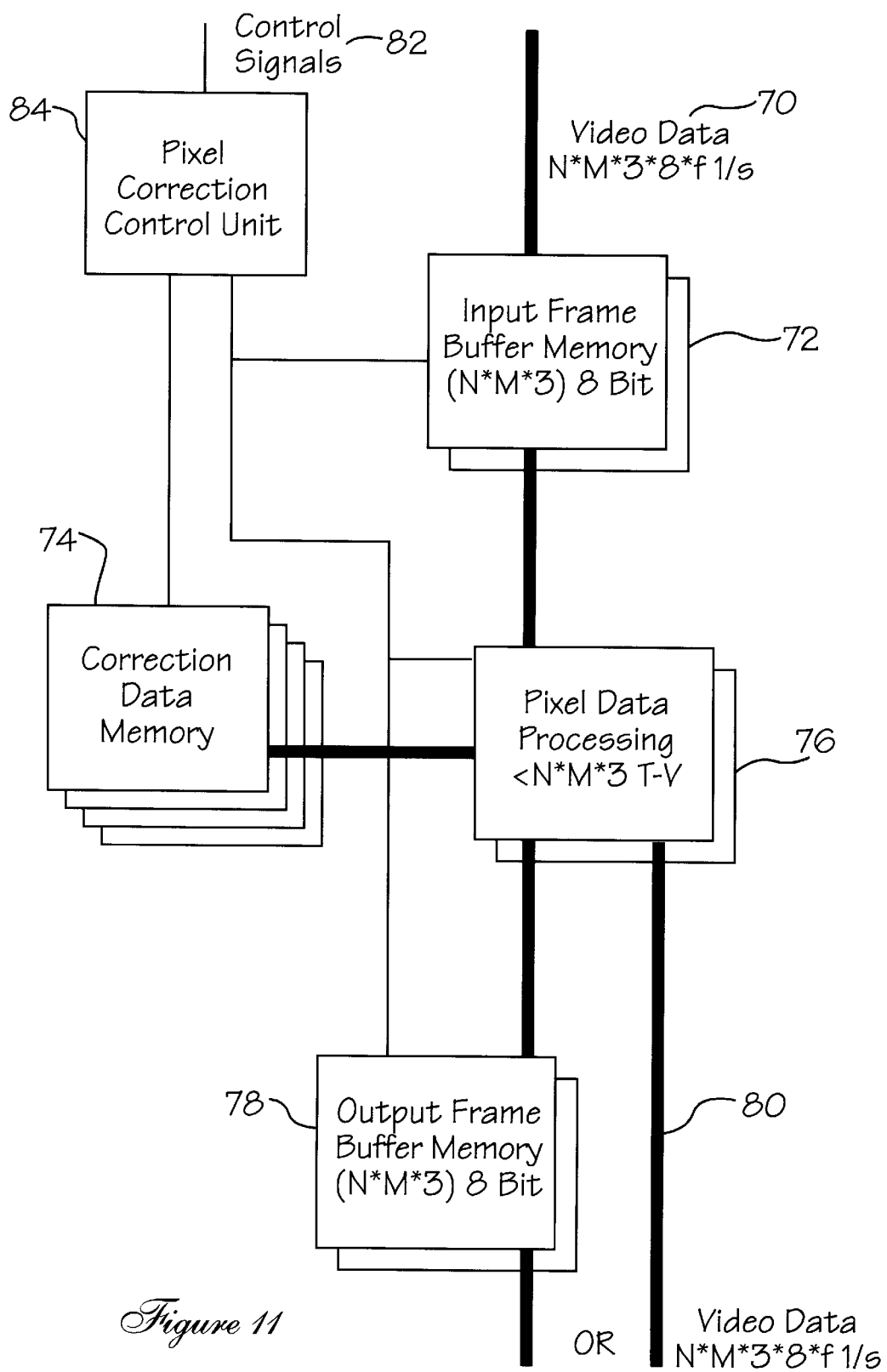
FIG. 11 is a block diagram level view of the implementation for correcting incoming pixel data using absolute or relative pixel matching for optical, electro-optical, ambient light, electronic, mechanical, and materials anomalies and including the cell gap at the seams.

Now referring to FIG. 11, an illustration of the block diagram level implementation of the general correction procedure for 24 bit color is shown. Implementations for other color resolutions are similar and will be obvious to those skilled in the art. The incoming video data 70 is first temporarily stored in an input frame buffer memory 72. The video data is read from the input frame buffer 72 and correction data from the correction data memory 74 under the control of the pixel correction control unit 84 into the pixel data processor 76. The correction data memory 74 may be non-volatile memory, or volatile memory initialized to values stored in auxiliary non-volatile memory, or be initialized with values calculated from values stored in non-volatile memory. This ensures that correction data is not lost, when the display is powered down. The appropriate corrections to the pixel video data are then applied by performing electronic pixel data processing using one or more processing units. Since both incoming and corrected video data for each sub-pixel are comprised of a single n-bit integer number (usually 8-bit), all pixel data processing only needs be done to n bit precision. Once pixel data has been corrected, it can be sent directly into the display 10 (FIG. 1a). In an alternate embodiment, the pixel correction control unit 84 may be merged with the pixel data processing unit 76. Yet in another alternate embodiment, corrected pixel data may be collected in an output frame buffer memory 78 before it is sent to the display 10.

Sub-pixel data corrections may be accomplished in many ways. In one embodiment, sub-pixels are grouped according to their effective T-V curve responses and then each group is assigned a previously stored response function specific to that group. Groups may, for example, include interior area sub-pixels for each tile, and edge pixels for each inner and outer edge of each tile. As long as the number of groups is reasonable, the amount of data for the response functions that must be stored in the correction data memory will be acceptable. In another embodiment look up tables may be assigned to groups of sub-pixels. These tables would contain pixel data corrections using simple indexing schemes. Again, as long as the number of groups remains reasonable, the amount of data to be stored in the correction data memory will be acceptable.

In the simplest piecewise constant interpolation procedure with (s) segments, a single constant needs to be added to the sub-pixel data in the appropriate segment or:

$$r'(m,n)=r(m,n)+\Delta r(m,n,ir)$$

$$g'(m,n)=g(m,n)+\Delta g(m,n,ig)$$

$$b'(m,n)=b(m,n)+\Delta b(m,n,ib)$$

where the segment indices ir, ig, and ib are chosen to satisfy $$r(m,n,ir)<r(m,n)<r(m,n,ir+1)$$

$$g(m,n,ig)<g(m,n)<g(m,n,ig+1)$$

$$b(m,n,ig)<b(m,n)<b(m,n,ig+1)$$

and 1<=ir, ig, ib<=s. r(m,n), g(m,n) ,b(m,n) and r'(m,n), g'(m,n), b'(m,n) denote the uncorrected and corrected sub-pixel response, respectively. $\Delta r(m,n,ir)$, $\Delta g(m,n,ig)$ and $\Delta b(m,n,ib)$ denote the constants for the correction at each sub-pixel and gray scale segment. Segment indices are bounded by 1<=ir, ig, ib<=s and pixel indices by 1<=m,n <= resolution of screen. Above (m,n) denotes a pixel with array indices m and n and ir, ig, and ib the segment index for the red, green, and blue sub-pixels, respectively. Note that the above equations do not include any cross terms between the drive signals or corrections applied to the sub-pixels. If such cross terms are desirable they can be added at the expense of the complexity of the implementation and additional storage capacity in the correction data memory.

These equations can be applied to all pixels (m,n), regions of pixels, sets of pixels, or individual pixels. Since tiled displays normally have vertical, or horizontal, or vertical and horizontal seams, pixels in close proximity to the seams are easily identified with rectangular pixel indices: one index is constant and the other varies along the length of the seam. The implementation of these equations in the pixel processor simply requires 8-bit adders. The speed and number of adders required depends on the video data rate and the number of pixels. Note that if there is no pixel-to-pixel data dependency, parallel pixel data processing can be used without restriction. Smoothing of sub-pixel corrections may introduce a modest amount data dependency. Therefore the throughput can in almost all cases be made to match the video data rate. The total memory capacity for storing the correction data is m*n*3*s 8-bit words for the entire display, if all pixels are to be corrected. For example, for an SVGA display with a resolution of (m,n)=(800×600) and 8 gray scale segments this gives 11.5 M 8-bit words or 11 Mega-Bytes. For a tiled display with corrections applied only to k rows or columns on both sides of the seams, the storage requirement is reduced to a small fraction of this value. For example, for a 2×2 array of tiles with k=10, there are only 2*k*(n+m)*3*s=672 K bytes to store.

Similarly in the piecewise linear case, a difference, a multiplication, and two additions shall be performed to the sub-pixel data in the appropriate segment. The equations now read:

$$r'(m,n)=r(m,n)+\Delta r(m,n,ir)+rs(m,n,ir)*[xr(m,n)xr(m,n,ir)]$$

$$g'(m,n)=g(m,n)+\Delta g(m,n,ig)+gs(m,n,ig)*[xg(m,n)-xg(m,n,ig)]$$

$$b'(m,n)=b(m,n)+\Delta b(m,n,ib)+bs(m,n,ib)*[xb(m,n)-xb(m,n,ib)]$$

where:

$$r(m,n,ir)<r(m,n)<r(m,n,ir+1)$$

$$g(m,n,ig)<g(m,n)<g(m,n,ig+1)$$

$$b(m,n,ig)<b(m,n)<b(m,n,ig+1)$$

and $1<=ir$, $ig$, $ib<=s$. $\Delta r(m,n,ir)$, $\Delta g(m,n,ig)$ and $\Delta b(m,n,ib)$ denote the constants; $rs(m,n,ir)$, $gs(m,n,ig)$, and $bs(m,n,ib)$ the slopes for the piecewise linear corrections; $xr(m,n)$, $xg(m,n)$, and $xb(m,n)$ the input signals for the current sub-pixel; $xr(m,n,ir)$, $xg(m,n,ig)$, and $xb(m,n,ib)$ the input signals for the current gray scale segment and for each sub-pixel and gray scale segment. The implementation of these equations in the pixel processor simply requires 8-bit adders and multipliers. Parallel processing can again be used, if desired. The speed and number of the required adders and multipliers depends on the video data rate and the number of pixels. The total memory capacity for storing the correction data is m*n*3*s*2 8-bit words for the entire display, if all pixels are to be corrected. For example, for an SVGA display with a resolution of (m,n)=(800×600) and 8 segments this gives 23 M 8-bit words or 23 Mega-Bytes. For a tiled display with corrections applied only to k rows or columns on both sides of the seams, the storage requirement reduces to a small fraction of this value. For example, for a 2×2 array of tiles with k=10, there are 2*k*(n+m)*3*s*2 =1.34 M bytes to store.

As before the above equations do not include any cross terms between the drive signals or corrections applied to the sub-pixels. If such cross terms are desirable they can be added at the expense of the complexity of the implementation and additional storage capacity of the correction data memory. Higher order piecewise interpolation procedures may be applied in a similar fashion by performing 8-bit arithmetic operations. Additional storage capacity in the correction data memory needs to be provided for each new parameter. The estimation of the capacity can be done in a straightforward manner by extending the formulas show above.

Irrespective of the specific correction algorithm used, the correction data must be acquired. This can be done by measuring the luminance of each sub-pixel under gray scale excitation for one or multiple levels in each segment. The actual measurement can be done by scanning over the pixel array of the display using a luminance meter over individual pixels, or alternatively using a camera, such as a charge coupled device (CCD) camera, that records the entire array, or substantial regions of the pixel array, in parallel. In the former case the acceptance angle of the luminance detector must be small enough so that adjacent pixels don't contribute to the recorded luminance for the pixel being measured. In the latter case the camera may have to be carefully aligned with display pixel array such that there preferably is a simple correspondence between the display pixels and the camera image. A one-to-one correspondence is preferred, but other arrangements can be made to work as well. Irrespective of the measurement method used, the result is a set of measured luminance values rm(m,n,ir,ur),gm(m,n,ig,ug), bm(m,n,ib, ub) for each measured pixel index (m,n), segment index (ir,ig,ib), and gray scale index (ur,ug,ub). The correction data can then be computed from the difference between the measured data and nominal data for each pixel to be corrected. For example, for the piecewise constant correction procedure the correction data for each sub-pixel and gray scale segment is given by $$\Delta r(m,n,ir)=rn(m,n,ir,ur)-rm(m,n,ir,ur)$$

$$\Delta g(m,n,ig)=gn(m,n,ig,ug)-gm(m,n,ig,ug)$$

$$\Delta b(m,n,ib)=bn(m,n,ib,ub)-bm(m,n,ib,ub),$$

where rn(m,n,ir,ur), gn(m,n,ig,ug), and bn(m,n,ib,ub) denote the nominal luminance value for this sub-pixel and gray scale segment. The extension of this procedure to other interpolation schemes, including piecewise linear and higher order methods, is straightforward and well known to those skilled in the art and will not be explicitly explained here.

Instead of determining the correction data from the measured effective T-V curves, in some cases it may be preferable to measure the physical characteristics of the edge effect directly and then compute the correction data from this knowledge. As an illustration of this, consider a cell gap change close to the seam that could be measured using well known optical techniques. The cell gap data as a function of location can then be translated into T-V curve correction data.

Figure 12:
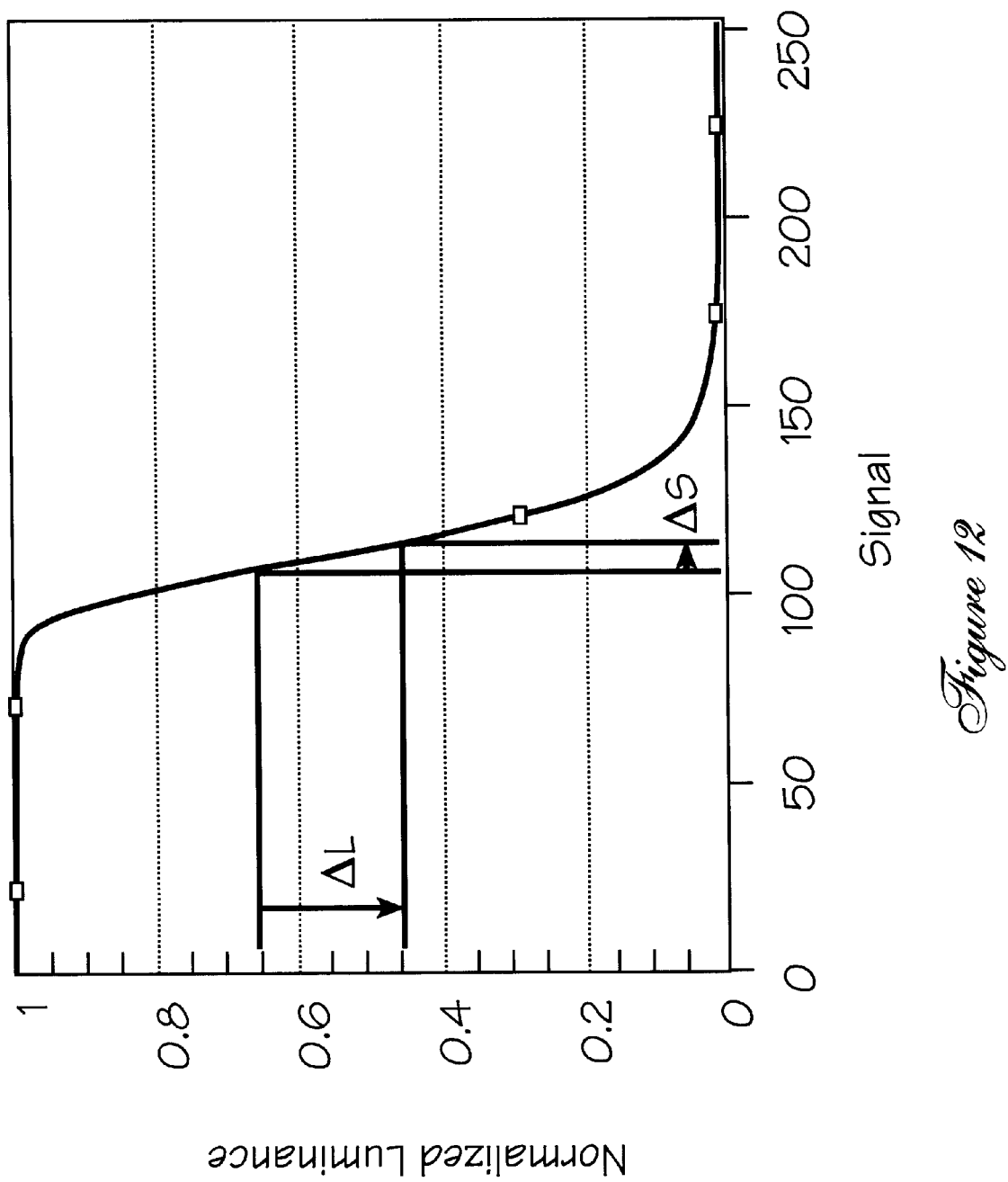
FIG. 12 depicts the graphical determination of the correction to the input signal Δs of a sub-pixel given the desired correction for the normalized output luminance ΔL.

The remaining issue is to find a way to change the input data given to the sub-pixels such that the corrections specified above are realized. This is simply given by the inverse function of the effective T-V curve of the sub-pixel in question. The relationship between the required luminance correction and the corresponding input data bits is illustrated in FIG. 12 graphically for a normally white LCD. The input data correction $\Delta S$ is simply directly given by the required normalized luminance correction $\Delta L$. Mathematically, if an analytical representation for the effective T-V curve L(S) is available, $\Delta S$ can be immediately obtained from the inverse function $L^{-1}$ via $\Delta S=L^{-1}(L+\Delta L)-L^{-1}(L)$. If a numerical representation $(S_i, L_i)$ for the effective T-V curve is known, $\Delta S$ is determined by the closest mesh point $S_k$ that corresponds to $\Delta L$ in the table. Both negative and positive corrections can be specified in this fashion but the resulting corrected normalized sub-pixel luminances must be contained in the interval (0,1). The smallest corrections that can be applied in the most sensitive steep region of the effective T-V curve (maximum magnitude of the slope) determines the resolution of this correction procedure. For a linear T-V curve and uniform allocation of bits the smallest correction is given by the least significant bit, i.e. $1:2^n$. For non-linear effective T-V curves it will depend on the number of bits and the length of the flat regions of the effective T-V curve and generally be different from $1:2^n$. The resolution of the correction procedure can be improved by going to higher resolution digital-to-analog converters (DACs) within the data drivers or by allocating more bits to the steep region of the effective T-V curve in a non-uniform fashion. The resolution of the correction procedure can also be enhanced by using time-domain dithering, i.e., averaging over different correction signals applied during successive frames, thus producing the desired correction at time domain averages. This technique is frequently used to enhance the color resolution of the flat panel plasma displays, for which it is difficult to fabricate the required high voltage driver IC's at the desired position.

The correction procedures described above may lead to sharply varying corrections from pixel to pixel. Such corrections may also be influenced by measurement noise as well. Unless complete grayscale uniformity within the detection threshold of the human eye is achieved for each sub-pixel, visually objectionable artificial patterns may results. Such patterns can be removed, if high spatial frequency components are removed using signal processing techniques. In such cases it will be advantageous to filter the measured pixel or sub-pixel luminance data or the corrected data using suitable two-dimensional video signal filtering algorithms. Examples of desired algorithms well known in the field of digital signal processing include windowing, analog filtering, digital filtering, low pass filtering, band pass filtering, fast Fourier transform, and wavelets. Other filtering or smoothing techniques may be used as well.

Figure 13:
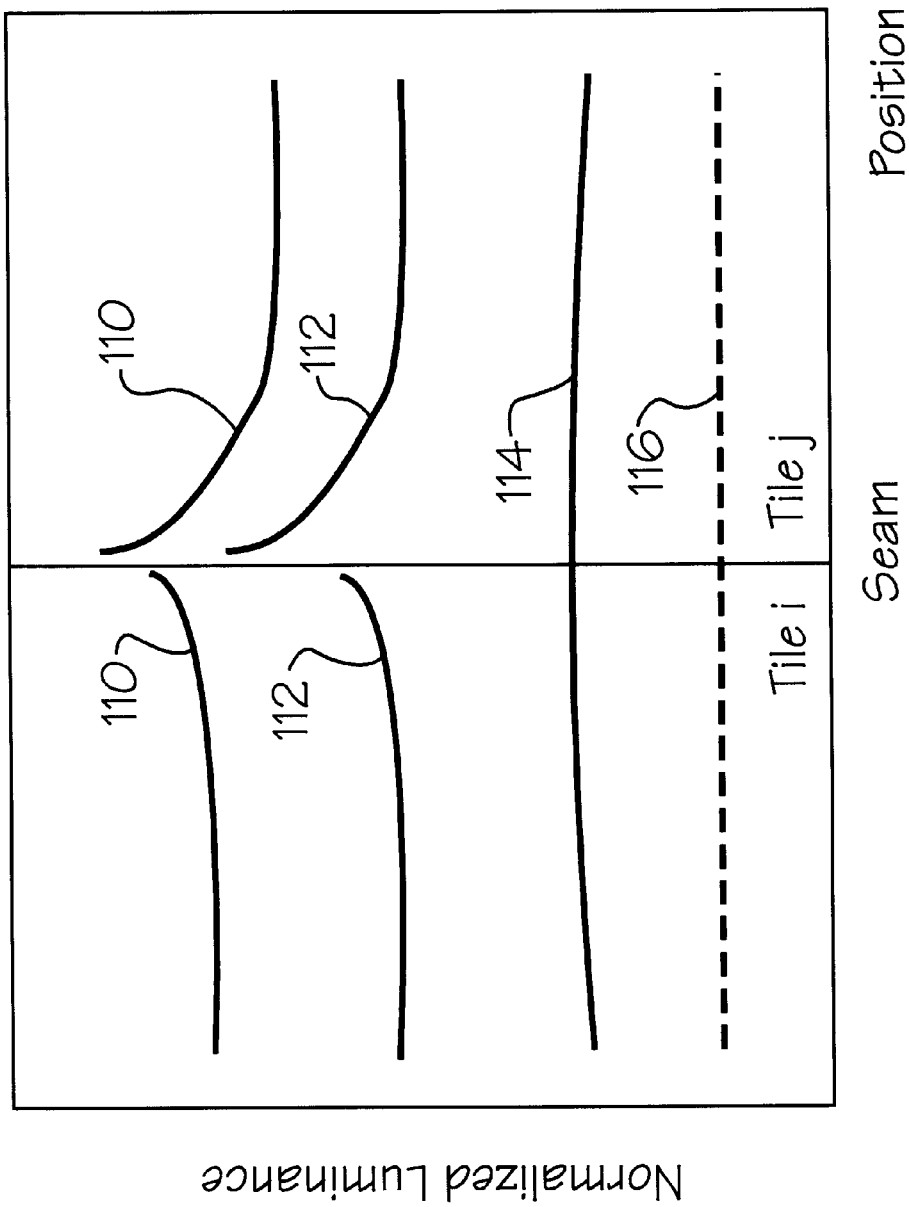
FIG. 13 illustrates luminance lines scans across a seam in a tiled liquid crystal display before correction, after correction to match relative luminance levels, and after correction to smooth luminance levels.

In some cases it may not be desirable to try to uniformly match neither the absolute or relative luminance and chromaticity levels close to the seams but rather use smoothing or blending techniques to suppress any abrupt changes and sharp gradients below the perceptual threshold levels of the human vision system. This has been illustrated in FIG. 13. A luminance line scan for a gray scale field across a seam has been drawn for four cases: (a) the uncorrected display 110; (b) a display corrected to match the relative luminance levels in the interior of the tiles 112; (c) a display with corrections smoothed across the seam such that the discrimination threshold for the luminance gradient remain below the visual detection threshold 114, and (d) a display corrected to match absolute level across the seam 116. The curves have been shifted with respect to each others in order to show their difference more clearly. Smoothing can be performed in two fundamentally different ways: (a) in static sense, if the smoothing procedure remains the same over the time of use of the display, or (b) in the dynamic sense, if smoothing is done at the time of displaying the each video image.

Static smoothing may be applied to the measured pixel data or the correction data using mathematical smoothing techniques well known to those skilled in the art of numerical mathematics and/or signal processing. Therefore static smoothing simply becomes one of the steps in the algorithm that determines the sub-pixel correction data stored in the correction data memory. Static smoothing does not introduce any real time data dependencies and therefore pixel data processing can be executed in parallel, if desired. Static smoothing does not change the electronic implementation of video data correction procedure. It is fully compatible with the types of architectures shown in FIG. 11.

On the other hand, dynamic smoothing during real time display operation introduces real data dependencies. The range of this dependency is determined on the specific dynamic smoothing algorithm that is adopted. Dynamic smoothing of non-uniformities introduced by optical, electro-optical, ambient light, electronic, mechanical, or materials anomalies, may be done by operating on the corrected video data in the output frame buffer memory 78. Dynamic smoothing requires edge pattern detection in order to discriminate against sharp details in the actual video data. However, since edges are static with a fixed pattern and a characteristic signature, they can be easily distinguished from patterns in the actual video data. Many electronic implementations of dynamic smoothing are possible using custom designed hardware and general purpose digital signal processing (DSP) chips. Smoothing algorithms, such as moving averages, are inherent parallel, because pixel data interactions are local. Dynamic compared to static smoothing is much more complex to implement, but allows for correction of time variable edge related anomalies, such as those arising from display heating or differential aging.

Consider finally the full procedure for correcting a given tiled display for optical, electro-optical, ambient light, cell, gap, mechanical, or materials anomalies at the tile edges. The piecewise linear interpolation method has been chosen in this procedure. The display is assumed to be divided into interior regions of the tiles, each of which is treated as one object, and individual pixels in predetermined regions in close proximity seams, each of which is treated as one object in the correction procedure. This example is chosen to illustrate how the teachings of this invention are related to each other and how they would be used rather than exhaust all possible algorithms and methods that have been described above. The full procedure will be described in two sub-procedures. The first one will determine corrections for the interior regions of the tiles and the second for the individual pixels in the seam regions. Both sub-procedures are as logically connected steps.

Sub-Procedure 1: Corrections for Interior Regions

Step 1 Select new primary color

Step 2 Select new gray scale segment for current primary color

Step 3 Display primary current gray scale image

Step 4 Measure and store primary color gray scale image map over entire pixel array Step 5 Filter high spatial frequency components from image map, if desired Step 6 Determine tile specific correction data constants for current gray scale segment and primary color that match interior regions of all tiles to the same absolute or relative luminance level Step 7 Go to step 2. If all gray scale segments are done, go to step 8

Step 8 Determine tile specific correction data slopes for gray scale segments for current primary color. If necessary display and measure new image map.

Step 9 Go to step 1. If all primary colors are done, go to step 10

Step 10 Store all tile interior specific gray scale segment and primary specific correction data, constants and slopes, in a format appropriate for correction data storage memory and pixel data processing.

Sub-Procedure 2: Corrections for Edge Pixels

Step 1 Select new primary color

Step 2 Select new gray scale segment for primary color

Step 3 Display primary color gray scale image for constant correction

Step 4 Measure and store primary color gray scale image over entire pixel array with correction data from sub-procedure 1 applied to interior regions of tiles Step 5 Filter high spatial frequency components from image map, if desired
Step 6 Select new sub-pixel in seam region
Step 7 Determine sub-pixel specific correction data constant for current sub-pixel, gray scale segment and primary color
Step 8 Go to step 6. If all sub-pixels done, go to step 9
Step 9 Display primary color gray scale image for slope correction
Step 10 Measure and store primary color gray scale image over entire pixel array with correction data from sub-procedure 1 applied to all interior regions of tiles and constant gray scale correction applied to all sub-pixels in seam regions
Step 11 Filter high spatial frequency components from image map, if desired
Step 12 Select new sub-pixel in seam region
Step 13 Determine sub-pixel specific correction data slope for current sub-pixel, gray scale segment and primary color
Step 14 Go to step 12. If all sub-pixels done, go to step 15
Step 15 Apply smoothing algorithm to sub-pixel correction data (constant, slope) for current gray scale segment and primary color
Step 16 Go to step 2. If all gray scale segments done, go to step 17
Step 17 Go to step 1. If all primary colors done, go to step 18
Step 18 Store all seam region sub-pixel, gray scale segment, and primary color specific correction data, constants and slopes, in a format appropriate for correction data storage memory and pixel data processing.

In the above procedures a specific weighted response curve is assumed to describe the effective T-V curve. If the viewer wants to switch the chosen weighted response curve to a different one, for example because of psychophysiological reasons or the chromaticity content of the images to be displayed, the entire procedure can be simply repeated. However, this involves quite a bit of additional work. Instead, the correction data for one weighted response curve can be directly transformed for the other response curve mathematically. This is possible because the impact of the edge effects associated with the tiled display have already been fully characterized and therefore uniquely determine the other correction data set.

Additional designs can be produced for specific display purposes or to match other liquid-crystal designs and sub-pixel color filters. Still additional designs can be formulated by those skilled in the art using the principles taught in this invention.

Although the correction algorithms in this invention have been described in the context of tiled liquid crystal displays, they can in some cases be applied to correct for similar anomalies in other display, such as monolithic LCD's with no seams or tiled LC displays expressly built to show seams. The latter includes video walls. The extension the teachings of this inventions to such other displays can easily be formulated by those skilled in the art.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method for correcting luminance and chromaticity variations caused by tile edge effects in tiled, flat-panel liquid crystal displays (LCDs), the steps comprising:

a) providing at least two LCD tiles arranged adjacent one another with a seam therebetween, each of said tiles having an edge proximate said seam and an interior region with a plurality of pixels disposed therein, said pixels being adapted to modify transmitted light upon stimulation by respective pixel stimulation signals;

b) mapping at least one region of said pixels in said LCD tiles, each of said pixels in said region having a similar effective T-V curve in an LCD tile;

c) determining a transfer function for said mapped region to change one of said effective T-V curves to a predetermined, reference effective T-V curve; and d) applying an inverse of said transfer function to said pixel stimulation signals so that said pixels in said region appear to exhibit said predetermined, reference effective T-V curve.

2. The method for correcting luminance and chromaticity variations in tiled, flat-panel LCDs as recited in claim 1: wherein said pixels comprise sub-pixels; said mapping step (b) comprises mapping regions of said sub-pixels, each having a similar effective T-V curve, said pixel stimulation signals comprising sub-pixel stimulation signals; and said applying an inverse transfer function step (d) further comprises applying an inverse of said transfer function to said sub-pixel stimulation signals.

3. The method for correcting luminance and chromaticity variations in tiled, flat-panel LCDs as recited in claim 2, wherein said inverse transfer function comprises a look-up table.

4. The method for correcting luminance and chromaticity variations in tiled, flat-panel LCDs as recited in claim 3, wherein said look-up table comprises at least one of the group of slope data and offset data.

5. The method for correcting luminance and chromaticity variations in tiled, flat-panel LCDs as recited in claim 2, wherein said inverse transfer function comprises piece-wise interpolation.

6. The method for correcting luminance and chromaticity variations in tiled, flat-panel LCDs as recited in claim 5, wherein said mapping step (b) comprises producing a contour map.

7. The method for correcting luminance and chromaticity (variations in tiled, flat-panel LCDs as recited in claim 6, wherein said contour map represents regions of sub-pixels each having a substantially identical effective T-V curve.

8. The method for correcting luminance and chromaticity variations in tiled, flat-panel LCDs as recited in claim 7, wherein said mapping step (b) comprises the sub-steps of:

i) measuring edge effects at a plurality of locations in an LCD tile; and ii) determining effective T-V curves representative of said measured cell gaps.

9. The method for correcting luminance and chromaticity variations in tiled, flat-panel LCDs as recited in claim 7, wherein said determining transfer function step (c) comprises determining a transfer function for sub-pixels for a mapped region.

10. The method for correcting luminance and chromaticity variations in tiled, flat-panel LCDs as recited in claim 9, wherein said transfer function is selectively applied to said sub-pixels dependent upon said primary colors thereof.

11. The method for correcting luminance and chromaticity variations in tiled, flat-panel LCDs as recited in claim 2, wherein said inverse transfer function is constructed using mathematical interpolation techniques based on at least one of: constants, slopes and higher-order terms.

* * * * *